US006314607B1

(12) United States Patent
Kinoshita

(10) Patent No.: US 6,314,607 B1
(45) Date of Patent: *Nov. 13, 2001

(54) WIPER SYSTEM FOR A VEHICLE

(75) Inventor: Nobuaki Kinoshita, Toyohashi (JP)

(73) Assignee: Asmo Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,256

(22) Filed: Dec. 17, 1998

(30) Foreign Application Priority Data

Dec. 22, 1997 (JP) .................................................. 9-352975

(51) Int. Cl.⁷ .................................. B60S 1/34; B60S 1/36
(52) U.S. Cl. .................................... 15/250.21; 15/250.351
(58) Field of Search ........................... 15/250.21, 250.23, 15/250.351, 250.13, 250.352

(56) References Cited

U.S. PATENT DOCUMENTS

| 4,720,885 | * | 1/1988 | Leroy et al. ...................... 15/250.21 |
| 4,776,057 | * | 10/1988 | Beneteau et al. .................. 15/250.21 |
| 5,860,186 | * | 1/1999 | Schael et al. ...................... 15/250.21 |
| 5,884,357 | * | 3/1999 | Schill et al. ....................... 15/250.21 |

FOREIGN PATENT DOCUMENTS

| 40 32 762 | | 8/1995 | (DE) . |
| 0182123 | | 5/1986 | (EP) . |
| 537659 | * | 4/1993 | (EP) ................................. 15/250.21 |
| 10-507143 | | 7/1998 | (JP) . |
| WO 96/11824 | | 4/1996 | (WO) . |

* cited by examiner

*Primary Examiner*—Gary K. Graham
(74) *Attorney, Agent, or Firm*—Parkhurst & Wendel, L.L.P.

(57) ABSTRACT

A wiper for a vehicle is provided with a quadric linking mechanism wherein a main lever and a sub-lever are connected to an arm head. The range of the rotation angle of the main lever is set in such a way that the angular velocity of rotation of the wiper arm is within a range of from 0.75 to 1.25 times (fluctuating within a range of ±25%) the angular velocity of rotation of the main lever, and the pitches between connecting shafts of the quadric linking mechanism consisting of each lever are set in such a way that the wiper arm pivots by a predetermined angle within said range of the rotation angle of the main lever. Therefore, not only is the wiping range enlarged, but a driver is not made to feel uncomfortable because the movement of the wiper arm is smooth and the fluctuation range of the angular velocity of rotation does not become too large.

4 Claims, 12 Drawing Sheets

FIG. 6

COMBINATIONS OF UPPER LIMITS OF RELATIVE RATIOS

DATA OF d WHEN a=1

ABSCISSA b

| ORDINATE c | 1 | 1.01 | 1.02 | 1.03 | 1.04 | 1.05 | 1.06 | 1.07 | 1.08 | 1.09 | 1.1 |
|---|---|---|---|---|---|---|---|---|---|---|---|
| 1 | 2.21 | 2.22 | 2.23 | 2.24 | 2.25 | 2.26 | 2.27 | 2.28 | 2.29 | 2.3 | 2.3 |
| 1.2 | 2.31 | 2.32 | 2.33 | 2.34 | 2.35 | 2.36 | 2.37 | 2.38 | 2.38 | 2.39 | 2.39 |
| 1.4 | 2.41 | 2.42 | 2.43 | 2.44 | 2.45 | 2.46 | 2.47 | 2.48 | 2.48 | 2.49 | 2.5 |
| 1.6 | 2.54 | 2.54 | 2.55 | 2.56 | 2.57 | 2.58 | 2.59 | 2.6 | 2.6 | 2.6 | 2.61 |
| 1.8 | 2.66 | 2.67 | 2.68 | 2.69 | 2.7 | 2.71 | 2.72 | 2.72 | 2.72 | 2.73 | 2.73 |
| 2 | 2.8 | 2.81 | 2.82 | 2.83 | 2.84 | 2.84 | 2.85 | 2.85 | 2.86 | 2.86 | 2.87 |
| 2.2 | 2.94 | 2.95 | 2.96 | 2.97 | 2.98 | 2.99 | 2.99 | 3 | 3 | 3 | 3.01 |
| 2.4 | 3.1 | 3.1 | 3.11 | 3.12 | 3.13 | 3.14 | 3.14 | 3.15 | 3.15 | 3.15 | 3.16 |
| 2.6 | 3.25 | 3.26 | 3.27 | 3.28 | 3.28 | 3.29 | 3.29 | 3.3 | 3.3 | 3.31 | 3.31 |
| 2.8 | 3.41 | 3.42 | 3.43 | 3.44 | 3.44 | 3.45 | 3.45 | 3.46 | 3.46 | 3.46 | 3.47 |
| 3 | 3.57 | 3.58 | 3.59 | 3.6 | 3.61 | 3.61 | 3.62 | 3.62 | 3.63 | 3.63 | 3.64 |

FIG. 10

COMBINATIONS OF LOWER LIMITS OF RELATIVE RATIOS

ABSCISSA b

DATA OF d WHEN a=1

| ORDINATE c | 1 | 1.01 | 1.02 | 1.03 | 1.04 | 1.05 | 1.06 | 1.07 | 1.08 | 1.09 | 1.1 |
|---|---|---|---|---|---|---|---|---|---|---|---|
| 1 | 1.86 | 1.85 | 1.85 | 1.85 | 1.87 | 1.89 | 1.91 | 1.93 | 1.95 | 1.97 | 1.99 |
| 1.2 | 1.93 | 1.92 | 1.92 | 1.92 | 1.94 | 1.96 | 1.98 | 2 | 2.02 | 2.04 | 2.06 |
| 1.4 | 2.02 | 2.01 | 2 | 2.01 | 2.03 | 2.05 | 2.07 | 2.09 | 2.11 | 2.13 | 2.15 |
| 1.6 | 2.13 | 2.12 | 2.11 | 2.11 | 2.13 | 2.15 | 2.17 | 2.19 | 2.21 | 2.23 | 2.25 |
| 1.8 | 2.25 | 2.24 | 2.23 | 2.24 | 2.26 | 2.28 | 2.29 | 2.31 | 2.33 | 2.35 | 2.38 |
| 2 | 2.39 | 2.38 | 2.37 | 2.37 | 2.39 | 2.41 | 2.43 | 2.45 | 2.47 | 2.49 | 2.51 |
| 2.2 | 2.53 | 2.52 | 2.51 | 2.52 | 2.54 | 2.56 | 2.58 | 2.59 | 2.61 | 2.63 | 2.65 |
| 2.4 | 2.69 | 2.67 | 2.66 | 2.68 | 2.69 | 2.71 | 2.73 | 2.75 | 2.77 | 2.79 | 2.81 |
| 2.6 | 2.85 | 2.84 | 2.82 | 2.84 | 2.86 | 2.87 | 2.89 | 2.91 | 2.93 | 2.95 | 2.96 |
| 2.8 | 3.02 | 3 | 2.99 | 3.01 | 3.02 | 3.04 | 3.06 | 3.08 | 3.09 | 3.11 | 3.13 |
| 3 | 3.19 | 3.18 | 3.16 | 3.18 | 3.21 | 3.21 | 3.23 | 3.25 | 3.26 | 3.28 | 3.3 |

F I G. 1 1
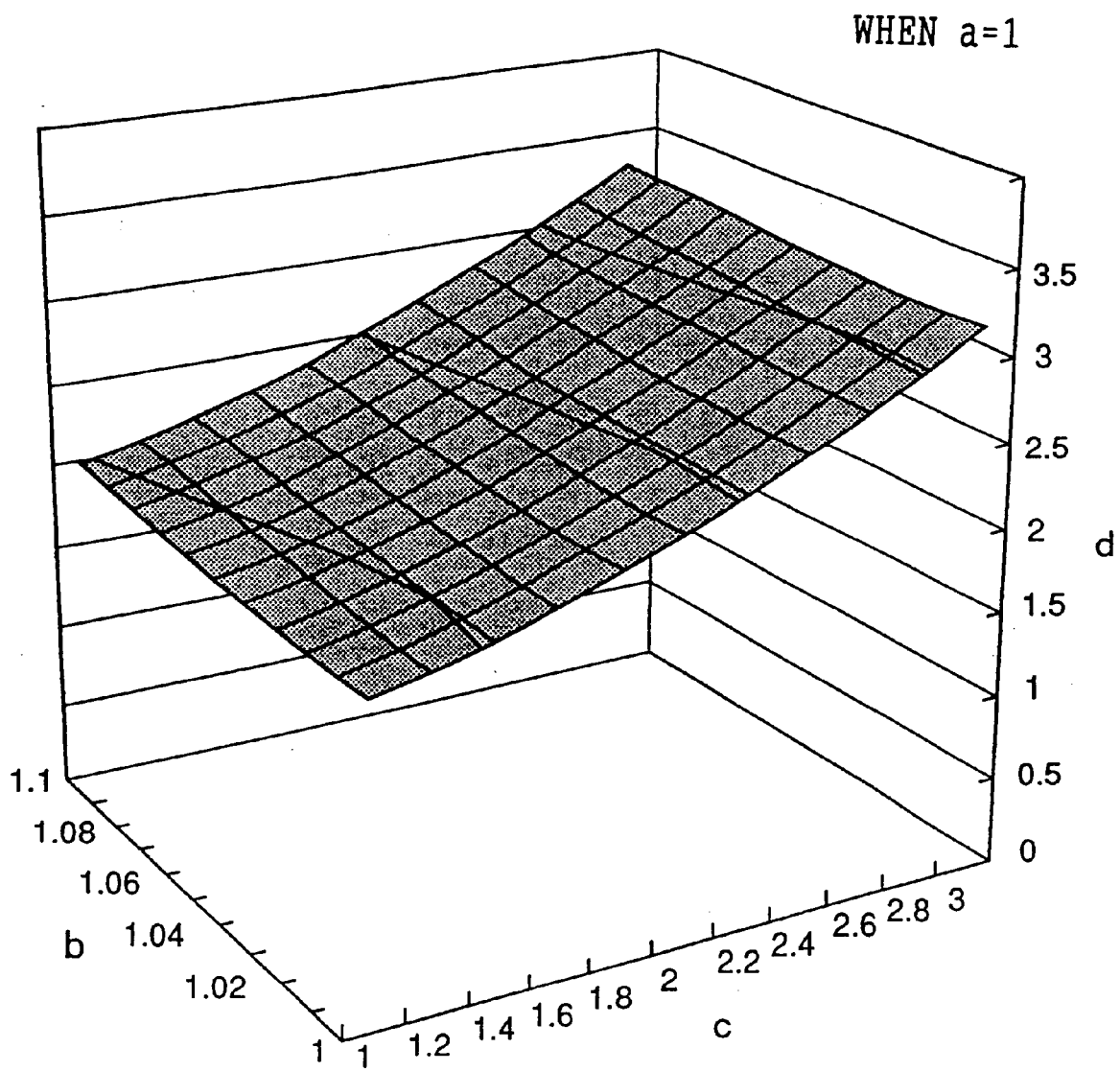

F I G. 1 2
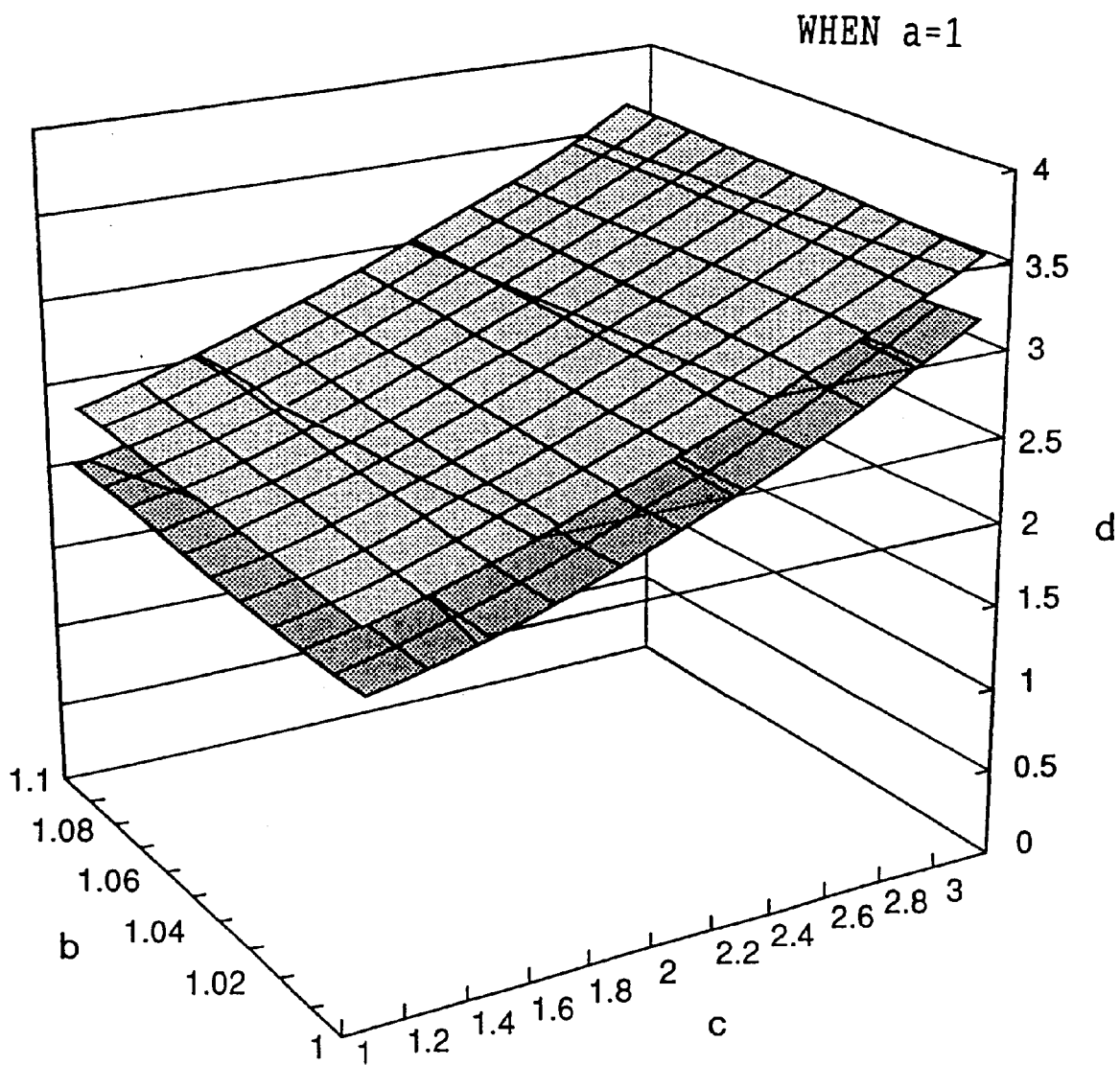

WIPER SYSTEM FOR A VEHICLE

BACKGROUND OF THE INVENTION

1. Field of the Invention

The present invention relates to a wiper device for a vehicle which wipes a windshield glass of an automobile and the like.

2. Description of the Related Art

A wiper device for a vehicle which wipes a windshield glass of an automobile and the like is composed of a wiper arm and a wiper blade held thereby.

In a wiper arm, one end portion of an arm head is fixed to a pivot shaft and a retainer is connected to the other end portion thereof via a spindle so as to be pivotable by a predetermined angle. Between the arm head and the retainer, a spring is hung for urging the retainer constantly toward a surface to be wiped of a windshield glass and the like. An arm piece is fixed to the end portion of the retainer. The end portion of the arm piece is bent substantially in a U-shaped configuration so as to serve as a holding portion, which is connected to and holds a wiper blade. On the other hand, the wiper blade is composed of a blade rubber for wiping by contacting with the surface to be wiped and a plurality of holding levers for holding the blade rubber.

During an operation of the wiper device for a vehicle, the wiper arm and the wiper blade reciprocate pivotally so that the blade rubber moves while in close contact with the windshield glass surface so as to wipe raindrops.

In a wiper device for a vehicle of this kind, a wide-range wiping type equipped with an expanding and contracting wiper arm has been proposed so that as little area as possible is left unwiped (so that the wiping range is expanded) in the whole region of the windshield glass surface. Further, among wiper devices of the wide-range wiping type, a wiper device equipped with a wiper arm referred to as a quadric linking wiper arm is especially known (one example is EP No. 0,182,123).

A wiper device for a vehicle equipped with a wiper arm using the quadric linking mechanism of this kind is provided with a pair of levers consisting of a main lever and a sub-lever. The main lever is connected to and fixed to a pivot shaft, and the sub-lever is pivotally supported by a spindle provided in a position at a predetermined distance from the pivot shaft. Further, not only are the main lever and the sub-lever disposed in parallel with each other, but an arm head is pivotally connected to their respective end portions via their connecting shafts.

When the main lever pivots with the pivot shaft, the arm head is pivoted by the sub-lever which regulates the movement of the arm head in accordance with the pivotal movement of the main lever, while the arm head is moving close to and away from the pivot shaft, with the result that the overall length of the wiper arm is expanded and contracted. Thus, the overall length of the wiper arm is seemingly expanded in a predetermined wiping position, thereby enlarging the wiping range thereof. Therefore, for example, when wiping a windshield glass surface whose lengthwise dimension is set relatively long, unwiped regions are less likely to occur in a whole region of the windshield glass surface compared with a wiper device equipped with a conventional wiper arm (the one wherein an arm head is fixed directly to a pivot shaft around which a wiper arm and a wiper blade simply reciprocates pivotally).

In a wiper device for a vehicle equipped with a wiper arm using the quadric linking mechanism of this kind, the overall length of the wiper arm is seemingly expanded in a predetermined wiping position as described above, thereby enlarging the wiping range thereof. On the other hand, as the wiping operation is conducted by a compound movement consisting of a rotation movement and an expansion and contraction movement, the velocity of rotation (the angular velocity) of the wiper arm (the wiper blade) fluctuates irregularly (becomes quicker or slower) between the upper reversed position and the lower reversed position, thereby leading the driver in some cases to feel uncomfortable.

This is caused by the excessively high fluctuation ratio (fluctuation range) of the angular velocity of rotation of the wiper arm (the wiper blade) between the upper reversed position and the lower reversed position. For example, when the fluctuation of said angular velocity of rotation exceeds the range of 25% of the angular velocity of rotation of a wiper device equipped with a conventional wiper arm (the one wherein an arm head is fixed directly to a pivot shaft around which a wiper arm and a wiper blade simply reciprocates pivotally), most drivers feel uncomfortable.

In addition, when the wiper device includes a second wiper device equipped with a second pivoting shaft which is independent of said pivoting shaft but pivots synchronously with said pivoting shaft, a second arm head which is connected to said second pivoting shaft, and a second wiper arm which is connected to said second arm head and to whose end portion a wiper blade is connected, a driver may feel uncomfortable because the fluctuation in the wiping speed of the wiper device which is equipped with a wiper arm using the quadric linking mechanism of this kind, in relation to that of said second wiper device, is large.

SUMMARY OF THE INVENTION

In view of the aforementioned fact, an object of the present invention is to obtain a wiper device for a vehicle wherein a quadric linking mechanism composed of a main lever, a sub-lever, and an arm head to which the main lever and the sub-lever are connected not only enlarges the wiping range but imparts a smooth movement to the wiper arm which does not make a driver feel uncomfortable.

In a wiper device for a vehicle according to a first aspect of the present invention which is provided with a quadric linking mechanism formed with a main lever which is connected to a pivoting shaft provided in a vehicle body and pivots with said pivoting shaft, a sub-lever which is pivotally supported by a spindle provided in the vehicle body at a predetermined distance from the pivoting shaft, and an arm head to which an end portion of the main lever is pivotally connected via a first connecting shaft and to which an end portion of the sub-lever is pivotally connected via a second connecting shaft, and a wiper arm which is connected to the arm head, to whose end portion a wiper blade is connected, and which pivots by a predetermined angle in accordance with the pivotal movement of the main lever, wherein the range of the rotation angle of the main lever is set in such a way that the angular velocity of rotation of said wiper arm is within a range of from 0.75 to 1.25 times the velocity of said rotation angle of said main lever, and the respective relative ratios of the distance, or pitch between the pivoting shaft and the first connecting shaft, the pitch between the first connecting shaft and the second connecting shaft, the pitch between the spindle and the second connecting shaft and the pitch between the pivoting shaft and the spindle are set in such a way that the wiper arm pivots by the predetermined angle within the range of the rotation angle of the main lever.

In a wiper device for a vehicle according to the first aspect of the present invention, the main lever is connected to and fixed to a pivoting shaft, and the sub-lever is pivotally supported by a spindle provided at a predetermined distance from the pivoting shaft. Further, not only are the main lever and the sub-lever disposed in parallel with each other, but an arm head is pivotally connected to an end portion of the main lever via a first connecting shaft, and the arm head is pivotally connected to an end portion of the sub-lever via a second connecting shaft, so as to form a quadric linking mechanism as a whole.

When the main lever pivots with the pivoting shaft, the arm head is pivoted by the sub-lever which regulates the movement of the arm head in accordance with the pivotal movement of the main lever, while the arm head is moving relatively close to and away from the pivoting shaft, with the result that the overall length of the wiper arm is expanded and contracted. Thus, the overall length of the wiper arm is seemingly expanded in and around a predetermined wiping position, thereby enlarging the wiping range thereof. Therefore, unwiped regions are less likely to occur in a whole region of a windshield glass surface compared with a wiper device equipped with a conventional wiper arm (the one wherein an arm head is fixed directly to a pivot shaft around which a wiper arm and a wiper blade simply reciprocates pivotally).

Here, in a wiper device for a vehicle according to the first aspect of the present invention, the configurational relation of each lever and shaft constituting the quadric linking mechanism is set as predetermined. Namely, in this wiper device, the rotation angle (the wiping range) of the wiper arm is set at a predetermined angle, while the quadric linking mechanism is achieved. Then, the range of the rotation angle of the main lever is set in such a way that the angular velocity of rotation of the wiper arm is within a range of from 0.75 to 1.25 times (fluctuating within a range of ±25%) the angular velocity of rotation of the main lever. The respective relative ratios of the pitch between the pivoting shaft and the first connecting shaft, the pitch between the first connecting shaft and the second connecting shaft, the pitch between the spindle and the second connecting shaft and the pitch between the pivoting shaft and the spindle is set in such a way that the wiper arm pivots by the predetermined angle within the set range of the rotation angle of the main lever.

This prevents the fluctuation range of the angular velocity of rotation of the wiper arm (the wiper blade), which wipes a wide range by a compound movement wherein the quadric linking mechanism, that is, the wiper arm is seemingly expanded and contracted while pivoted, from becoming too large between the upper reversed position and the lower reversed position. Therefore, as is the case with a wiper device equipped with a conventional wiper arm, there is almost no uncomfortable feeling on the part of the driver due to the wiping movement of the wiper arm.

Thus, in the wiper device for a vehicle of the first aspect of the present invention, the quadric linking mechanism composed of the main lever, the sub-lever, and the arm head to which the main lever and the sub-lever are connected not only enlarges the wiping range but imparts a smooth movement to the wiper arm which has hardly any effect of making a driver feel uncomfortable.

In addition, when the wiper device for a vehicle of the first aspect of the present invention includes a second wiper device equipped with a second pivoting shaft which is provided for the vehicle body independently of the pivoting shaft yet pivots synchronously with the pivoting shaft, a second arm head which is connected to the second pivoting shaft, and a second wiper arm which is connected to the second arm head and to whose end portion a wiper blade is connected, a driver experiences almost no uncomfortable feelings because the fluctuation in the wiping speed of the wiper device which is equipped with a wiper arm using the quadric linking mechanism of this kind, in relation to that of the second wiper device, is small.

Furthermore, when the rotation angle (the wiping range) of the wiper arm is set at 94.8° for wiping a certain region of a surface to be wiped, for example, for wiping a windshield glass in a certain shape, it is preferable that the range of the rotation angle of the main lever, wherein the angular velocity of rotation of the wiper arm is within a range of from 0.75 to 1.25 times the angular velocity of rotation of the main lever, is within a range from 75° to 178°, and the relative ratios of each pitch described above are, for example, 1:1.06:2.12:2.56 as the preferable relative ratios for the wiper arm to pivot by 94.8° as described above within the set range of the rotation angle of the main lever.

In a wiper device for a vehicle according to a second aspect of the present invention which is provided with a quadric linking mechanism formed with a main lever which is connected to a pivoting shaft provided in a vehicle body and pivots with said pivoting shaft, a sub-lever which is pivotally supported by a spindle provided in said vehicle body at a predetermined distance from said pivoting shaft, and an arm head to which an end portion of said main lever is pivotally connected via a first connecting shaft and to which an end portion of said sub-lever is pivotally connected via a second connecting shaft, and a wiper arm which is connected to the arm head and to whose end portion a wiper blade is connected, the respective relative ratios of the pitch between the pivoting shaft and the first connecting shaft, the pitch between the first connecting shaft and the second connecting shaft, the pitch between the spindle and the second connecting shaft and the pitch between the pivoting shaft and the spindle are set in such a way that the angular velocity of rotation of said wiper arm is set within a range of from 0.75 to 1.25 times the angular velocity of rotation of the main lever in the whole region of the wiping range of the wiper arm.

In a wiper device for a vehicle according to the second aspect of the present invention, the main lever is connected to and fixed to a pivoting shaft, and the sub-lever is pivotally supported by a spindle provided at a predetermined distance from the pivoting shaft. Further, not only are the main lever and the sub-lever disposed in parallel with each other, but an arm head is pivotally connected to an end portion of the main lever via a first connecting shaft, and the arm head is pivotally connected to an end portion of the sub-lever via a second connecting shaft, so as to form a quadric linking mechanism as a whole.

When the main lever pivots with the pivoting shaft, the arm head is pivoted by the sub-lever which regulates the movement of the arm head in accordance with the pivotal movement of the main lever, while the arm head is moving close to and away from the pivoting shaft, with the result that the overall length of the wiper arm is expanded and contracted. Thus, the overall length of the wiper arm is seemingly expanded in a predetermined wiping position, thereby enlarging the wiping range thereof. Therefore, unwiped regions are less likely to occur in the whole region of a windshield glass surface compared with a wiper device equipped with a conventional wiper arm (the one wherein an arm head is fixed directly to a pivot shaft around which a wiper arm and a wiper blade simply reciprocates pivotally).

Here, in a wiper device for a vehicle according to the second aspect of the present invention, the configurational relation of each lever and shaft constituting the quadric linking mechanism is set as predetermined. Namely, the respective relative ratios of the pitch between the pivoting shaft and the first connecting shaft, the pitch between the first connecting shaft and the second connecting shaft, the pitch between the spindle and the second connecting shaft and the pitch between the pivoting shaft and the spindle are set in such a way that the angular velocity of rotation of the wiper arm is within a range of from 0.75 to 1.25 times (fluctuating within a range of ±25%) the angular velocity of rotation of the main lever.

This prevents the fluctuation range of the angular velocity of rotation of the wiper arm (the wiper blade), which wipes a wide range by a compound movement wherein the quadric linking mechanism, that is, the wiper arm is seemingly expanded and contracted while pivoted, from becoming too large between the upper reversed position and the lower reversed position. Therefore, the wiping movement of the wiper arm has almost no negative impact on the driver s awareness, unlike a wiper device equipped with a conventional wiper arm.

In addition, when the wiper device for a vehicle of the second aspect of the present invention includes a second wiper device equipped with a second pivoting shaft which is provided for the vehicle body independently of the pivoting shaft yet pivots synchronously with the pivoting shaft, a second arm head which is connected to the second pivoting shaft, and a second wiper arm which is connected to the second arm head and to whose end portion a wiper blade is connected, a driver hardly feels any discomfort because the fluctuation in the wiping speed of the wiper device which is equipped with a wiper arm using the quadric linking mechanism of this kind, is small in relation to that of the second wiper device.

Thus, in the wiper device for a vehicle of the second aspect of the present invention, the quadric linking mechanism composed of the main lever, the sub-lever, and the arm head to which the main lever and the sub-lever are connected not only enlarges the wiping range but imparts a smooth movement to the wiper arm which has almost no ill-effect on the driver.

Further, when wiping a certain region of a surface to be wiped, it is preferable that, for example, the relative ratios of each pitch are 1:1.06:2.12:2.56 as the preferable relative ratios so that the angular velocity of rotation of the wiper arm is within a range of from 0.75 to 1.25 times the angular velocity of rotation of the main lever as described above.

BRIEF DESCRIPTION OF THE DRAWINGS

FIG. 6 is a corresponding view of the relative ratios showing combinations of the upper limits of the relative ratios of pitches of levers and shafts in a wiper device according to an embodiment of the present invention.

FIG. 10 is a corresponding view of the relative ratios showing combinations of the lower limits of the relative ratios of pitches of levers and shafts in a wiper device according to an embodiment of the present invention.

FIG. 11 is a corresponding view of the relative ratios of the lower limits representing the data shown in FIG. 10 as a three-dimensional graph.

FIG. 12 is a corresponding view represented in a graph synthesizing the relative ratios of the upper limits shown in FIG. 7 and the relative ratios of the lower limits shown in FIG. 11.

DESCRIPTION OF THE PREFERRED EMBODIMENTS

Figure 2:
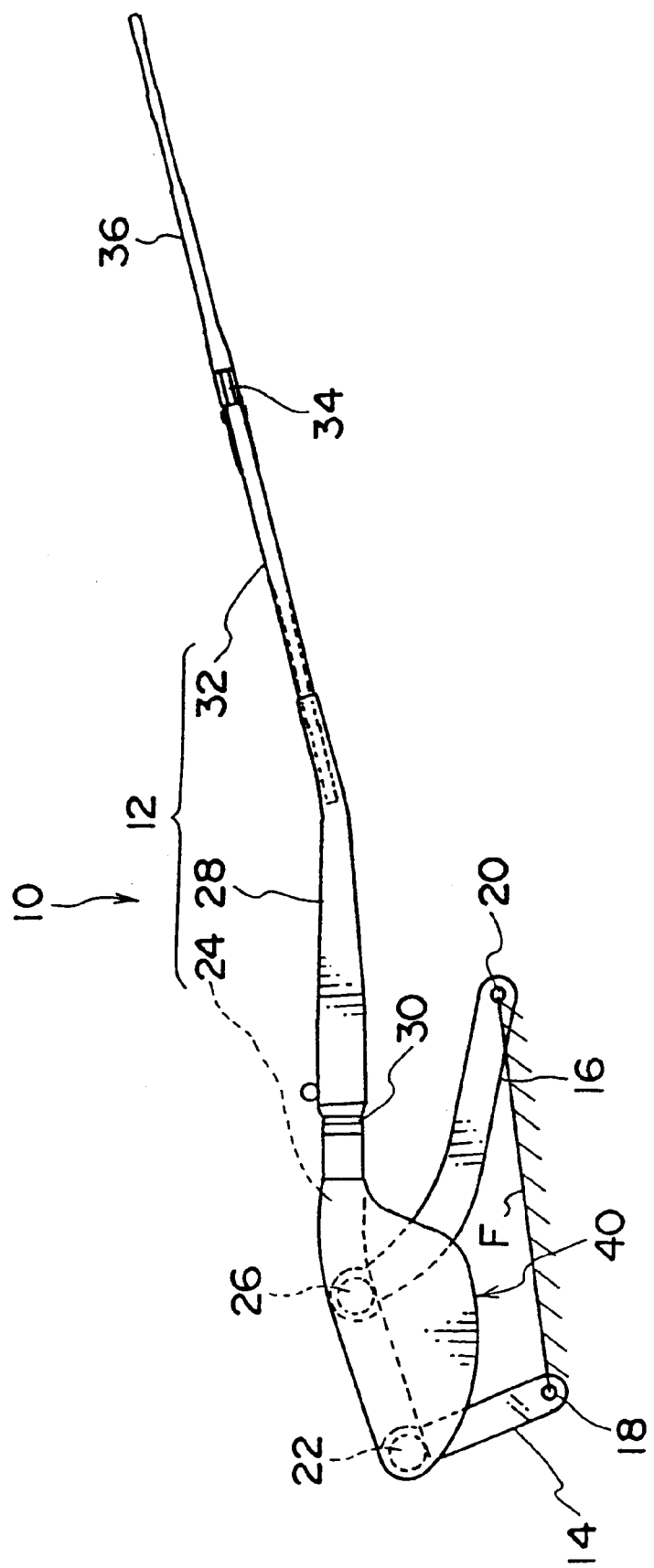
FIG. 2 is a plan view showing a whole structure of a wiper device according to an embodiment of the present invention.
Figure 3:
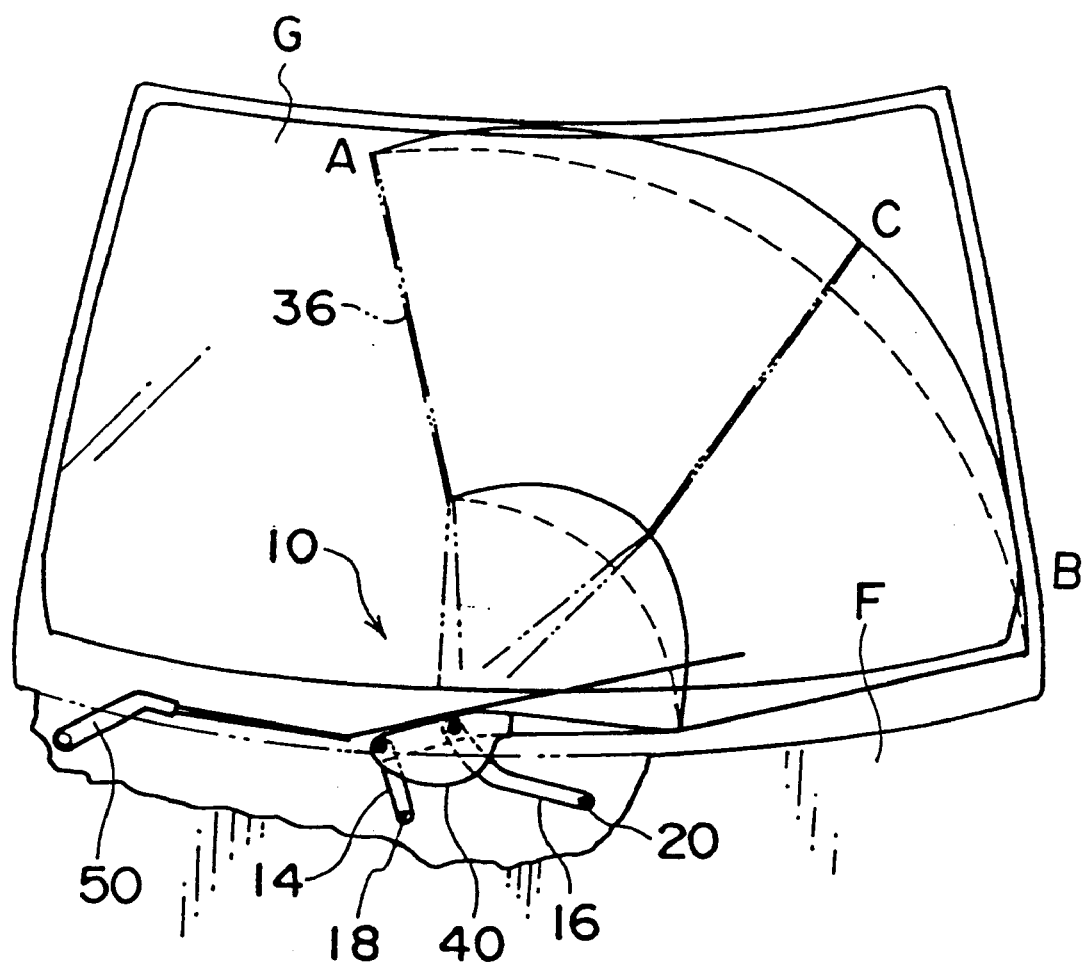
FIG. 3 is an elevational view of a wiper device applied to a vehicle according to an embodiment of the present invention.

FIG. 2 shows a whole structure of a wiper device for a vehicle 10 according to an embodiment of the present invention in a plan view. Further, FIG. 3 shows a wiper device 10 applied to a vehicle in an elevational view of a vehicle. A second wiper device 50 is also applied.

The wiper device 10 is composed of a wiper arm 12 and a wiper blade 36 held thereby.

The wiper arm 12 is equipped with a main lever 14 and a sub-lever 16. As one end portion of the main lever 14 is fixed to a pivot shaft 18 provided in the vehicle body, the main lever 14 constantly pivots with the pivot shaft 18. The sub-lever 16 is pivotally supported by a spindle 20 provided in a position at a predetermined distance from the pivot shaft 18. The vehicle body or a frame between the pivot shaft 18 and the spindle 20 forms a fixed link F. Further, not only the main lever 14 and the sub-lever 16 are disposed in parallel with each other, but an arm head 24 is pivotally connected to the end portion of the main lever 14 by a connecting shaft 22 serving as a first connecting shaft, and the arm head 24 is pivotally connected to the end portion of the sub-lever 26 by a connecting shaft 26 serving as a second connecting shaft.

A retainer 28 constituting the wiper arm 12 is connected to the other end portion of the arm head 24 via a spindle 30 so as to be pivotable by a predetermined angle in the directions in which the retainer 28 moves close to and away from a windshield glass G. Further, a spring (illustration omitted) is hung between the retainer 28 and the arm head 24 to urge the retainer 28 constantly toward the surface to be wiped of the windshield glass G. An arm piece 32, which constitutes the wiper arm 12 together with the retainer 28, is fixed at the end portion of the retainer 28. The end portion of the arm piece 32 is bent substantially in a U-shaped configuration so as to serve as a holding portion 34, which is connected to and holds a wiper blade 36 via an unillustrated clip member.

As described above, the wiper device 10 is provided with the wiper arm 12 using a quadric linking mechanism and has the following structure: when the main lever 14 pivots with the pivot shaft 18, the arm head 24 is pivoted by the sub-lever 16 which regulates the movement of the arm head 24 in accordance with the pivotal movement of the main lever 14, while the arm head 24 is moving close to and away from the pivot shaft 18, with the result that the overall length of the wiper arm 12 is expanded and contracted (as the supporting position of the arm head 24 is changed, the overall length appears as if it were expanded or contracted).

A link cover 40 is fitted over the arm head 24. The link cover 40 is made of resin, formed substantially in a fan-shape, and mounted on the arm head 24 so as to cover the arm head 24 from above. The link cover 40 is disposed in such a way as to extend toward a position directly above the main lever 14 and the sub-lever 16 described above (positioned on the outside of a vehicle in relation to the main lever 14 and the sub-lever 16), covering the linking mechanism portion consisting of the main lever 14, and the sub-lever 16, etc. (at least the region surrounded by each lever and the arm head 24).

In this case, the dimensions and shape of the link cover 40 are set in such a way that the link cover 40 covers at least the parts of the moving ranges of the main lever 14 and the sub-lever 16, which are not covered by the engine hood F of a vehicle (see FIG. 3), . Therefore, when the link cover 40 is mounted on the arm head 24, the linking mechanism portion consisting of the main lever 14, and the sub-lever 16, etc. (at least the region surrounded by each lever and the arm head 24) is not exposed to the outside.

Here, in the wiper device 10, the configurational relation of each lever and shaft constituting the quadric linking mechanism is set as predetermined. Namely, in the wiper device 10, the rotation angle (the wiping range) of the wiper arm 12 is set at a predetermined angle, while allowing the quadric linking mechanism. For example, in the present embodiment, the rotation angle (the wiping angle) of the wiper arm 12 is set at 94.8° in accordance with the shape of the windshield glass of the vehicle. Further, the range of the rotation angle of the main lever 14 is set in such a way that the angular velocity of rotation of the wiper arm 12 is within a range of from 0.75 to 1.25 times the angular velocity of rotation of the main lever 14 which is equal to the angular velocity of rotation of a conventional wiper arm (the one wherein an arm head is fixed directly to a pivot shaft around which the wiper arm simply reciprocates pivotally), and then the configurational relation of each lever and shaft constituting the quadric linking mechanism is set as predetermined in such a way as to obtain 94.8°, the above rotation angle of the wiper arm 12, within the range of the rotation angle of the main lever 14 (range A in FIG. 4).

Figure 1:
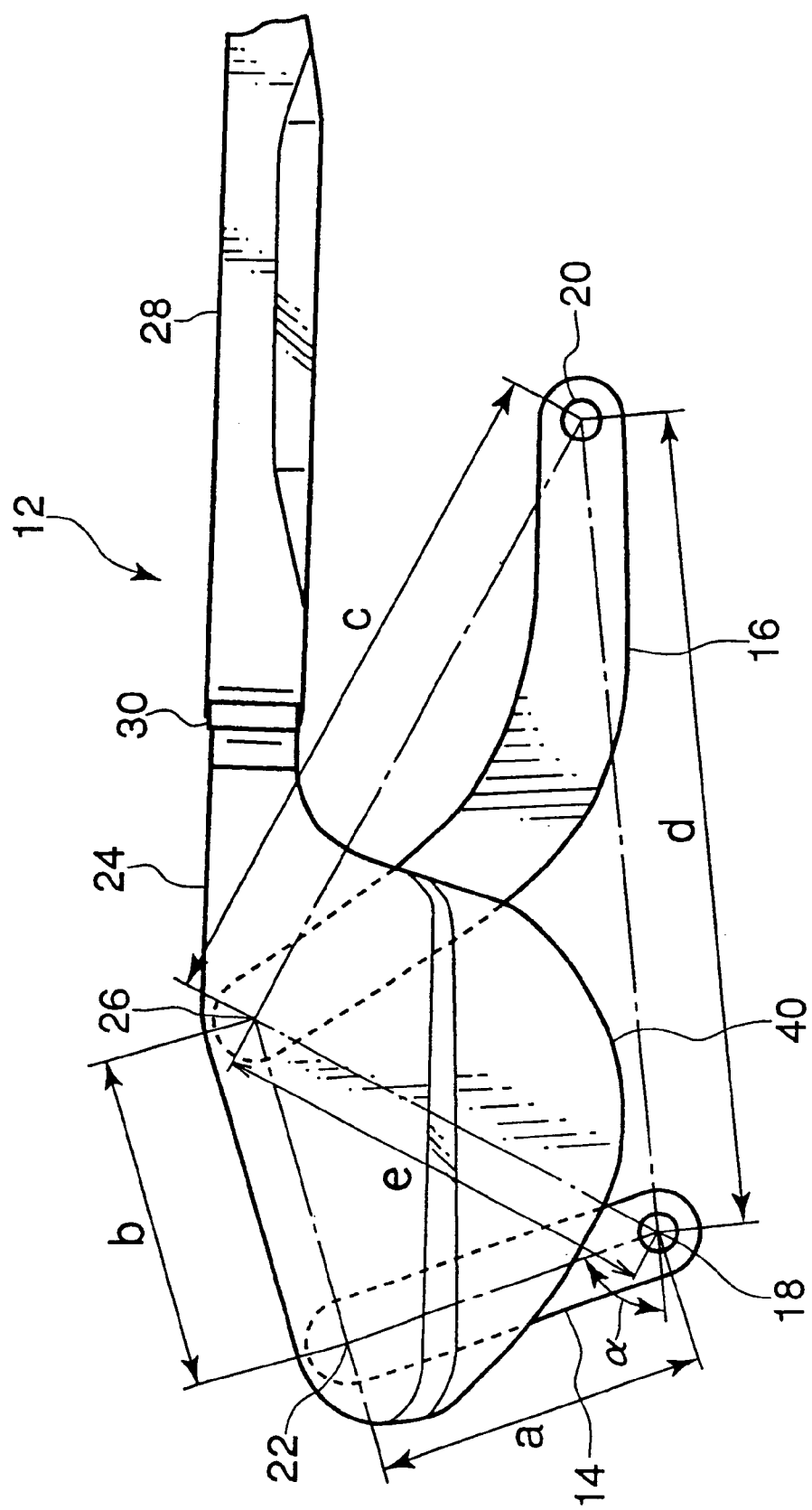
FIG. 1 is a plan view showing the configurational relation of each lever and shaft constituting a quadric linking mechanism of a wiper device according to an embodiment of the present invention.
Figure 4:
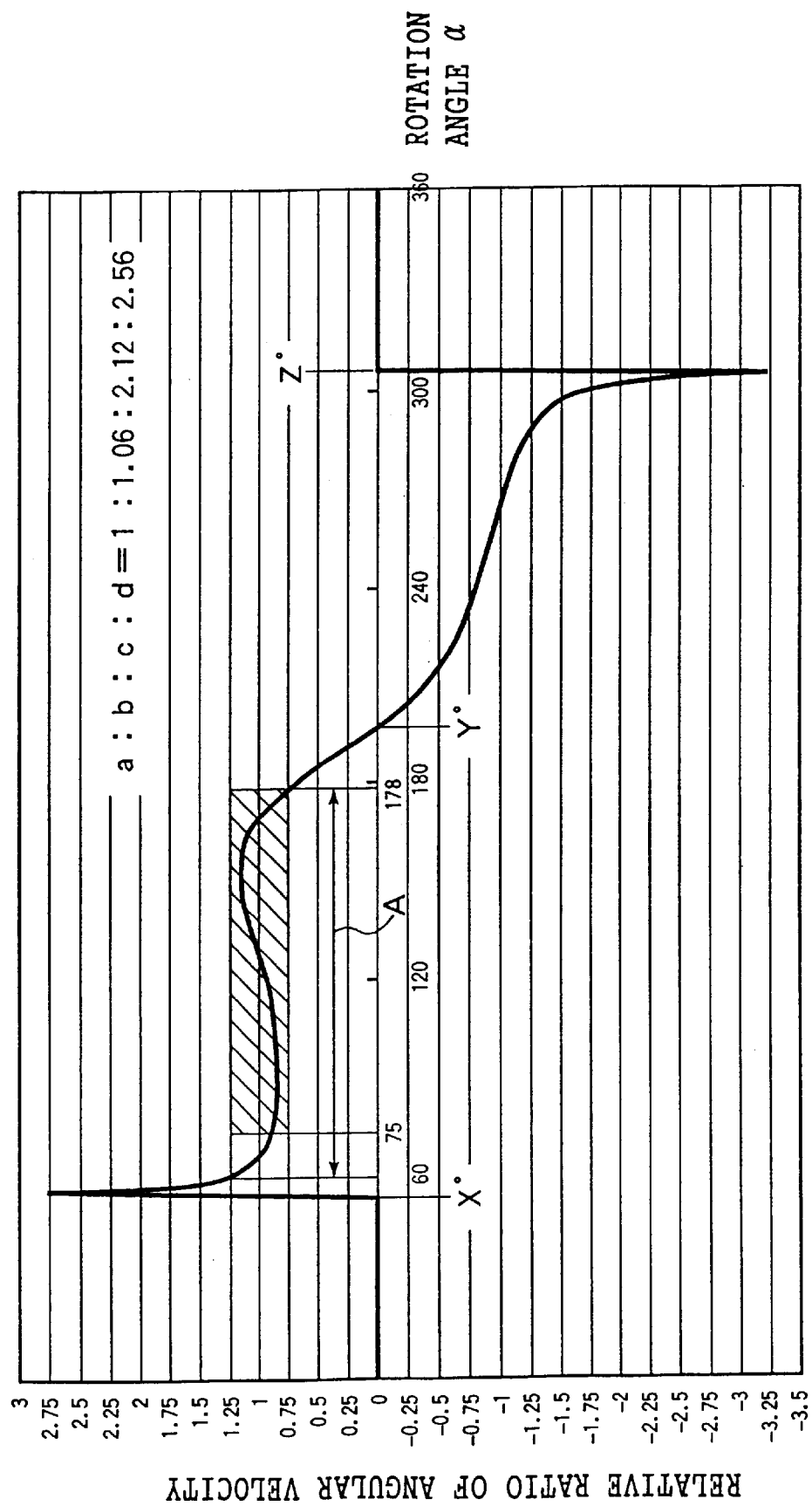
FIG. 4 is a characteristic view of angular velocities of rotation of a wiper arm when the relative ratio of pitches of levers and shafts are set as predetermined in a wiper device according to an embodiment of the present invention.

Namely, as shown in FIG. 1, wherein the wiper system is illustrated in the lowermost at-rest position (as also illustrated in FIGS. 2 and 3), the respective relative ratios of pitch a between the pivot shaft 18 and the connecting shaft 22, pitch b between the connecting shaft 22 and the connecting shaft 26, pitch c between the spindle 20 and the connecting shaft 26 and pitch d between the pivot shaft 18 and the spindle 20 are set, for example, so that a:b:c:d: are 1:1.06:2.12:2.56, whereby an angle of 94.8° is obtained for the above-described predetermined rotation angle of the wiper arm, by setting the rotation angle of the main lever 14 to within a range of from 75° to 178° out of the total range of the rotation angle of the main lever 14 so that the angular velocity of rotation of the wiper arm 12 is within a range of from 0.75 to 1.25 times the angular velocity of rotation of the main lever 14 (range A in FIG. 4).

Next, the operation of the present embodiment will be described.

In the wiper device for a vehicle 10 of the above structure, the reciprocating pivotal movement of the wiper arm 12 and the wiper blade 36 in accordance with the pivotal movement of the pivot shaft 18 wipes raindrops and the like off a windshield glass surface.

In this case, when the main lever 14 pivots with the pivot shaft 18, the arm head 24 is pivoted by the sub-lever 16 which regulates the movement of the arm head 24 in accordance with the pivotal movement of the main lever 14, while the arm head 24 is moving close to and away from the pivot shaft 18, with the result that the overall length of the wiper arm 12 is expanded and contracted (as the supporting position of the arm head 24 is changed, the overall length appears as if it were expanded and contracted). Thus, the overall length of the wiper arm 12 is seemingly expanded in a predetermined wiping position, thereby enlarging the wiping range thereof. Using pitch e between the pivot shaft 18 and the connecting shaft 26, the seeming expansion amount of the overall length of the wiper arm 12 is set by a+b−e. Therefore, compared with a wiper device equipped with a conventional wiper arm, an unwiped region is less likely to occur in the whole region of the windshield glass surface.

Also, in the wiper device 10, as the link cover 40 is provided for and integrated with the arm head 24, the link cover 40 prevents snow, ice, etc. from adhering to and staying in the moving range of the linking mechanism part composed of the main lever 14, the sub-lever 16, and the arm head 24. Therefore, the smooth operation of the linking mechanism, that is, the wiper device 10, is not hindered. Above all, foreign objects such as twigs can also be prevented from entering inadvertently in the moving range of said linking mechanism.

Furthermore, in the wiper device 10 according to the present embodiment, the configurational relation of each lever and shaft constituting the quadric linking mechanism is set here as predetermined. Namely, in the wiper device 10, the rotation angle (wiping range) of the wiper arm 12 is set at a predetermined angle, while allowing the quadric linking mechanism. Then, the range of the rotation angle of the main lever 14 is set in such a way that the angular velocity of rotation of the wiper arm 12 is within a range of from 0.75 to 1.25 times (fluctuating within a range of ±25%) the angular velocity of rotation of the main lever 14. The respective relative ratios of pitch a between the pivot shaft 18 and the connecting shaft 22, pitch b between the connecting shaft 22 and the connecting shaft 26, pitch c between the spindle 20 and the connecting shaft 26 and pitch d between the pivot shaft 18 and the spindle 20 are set in such a way that the wiper arm 12 pivots by said predetermined angle within the set range of the rotation angle of the main lever 14.

For example, in FIG. 4, a characteristic view of angular velocities of rotation of the wiper arm 12 when the rotation angle (wiping range) of the wiper arm 12 is set at 94.8° and the respective ratios of said pitch a to said pitch d are set as 1:1.06 2.12:2.56. In FIG. 4, the abscissa represents a rotation angle α of the main lever 14 (an angle made by the line connecting the pivot shaft 18 and the spindle 20 and the line connecting the pivot shaft 18 and the connecting shaft 22).

The ordinate represents the ratio of the angular velocity of rotation of the wiper arm 12 to the angular velocity of rotation of the main lever 14.

In this FIG. 4, the ranges where the rotation angle α is from 0° to X° and from Z° to 360° are regions where the linking mechanism does not work. Further, in the range where the rotation angle α is from Y° to Z°, the angular velocity of rotation of the wiper arm 12 is "−", which usually indicates that the wiper arm 12 is moving in the reverse direction to the usual forward direction of the wiper arm. Therefore, the device cannot be used in this region, either. Thus, it is within the region where the rotation angle α is from X° to Y° that the device is achieved.

Here, the range of the rotation angle of the main lever 14 is set in such a way that the angular velocity of rotation of the wiper arm 12, which is set at a predetermined rotation angle as described above, is within a range of from 0.75 to 1.25 times (fluctuating within a range of ±25%) the angular velocity of rotation of the main lever 14. For example, when the rotation angle (the wiping region) of the wiper arm 12 is set at 94.8° as described above, it is preferable to set the rotation angle of the main lever 14 to within a range from 75° to 178° out of the total range of the rotation angle of the main lever 14 so that the angular velocity of rotation of the wiper arm 12 is within a range of from 0.75 to 1.25 times the angular velocity of rotation of the main lever 14. The respective ratios of the above-described pitch a to pitch d are set as 1:1.06:2.12:2.56 so that the wiper arm 12 pivots by said predetermined angle (94.8°) within the set range of the rotation angle of the main lever 14. The above setting allows the angular velocity of rotation of the wiper arm 12 to be from 0.75 to 1.25 times (fluctuating within a range of ±25%) the angular velocity of rotation of the main lever 14 in the whole region of the rotation angle of the wiper arm 12.

The boundary value (threshold value) of the respective relative ratios of pitch a to pitch d are considered hereinafter so that the angular velocity of rotation of the wiper arm 12 is within a range of from 0.75 to 1.25 times the angular velocity of rotation of the main lever 14 as described above.

Figure 5:
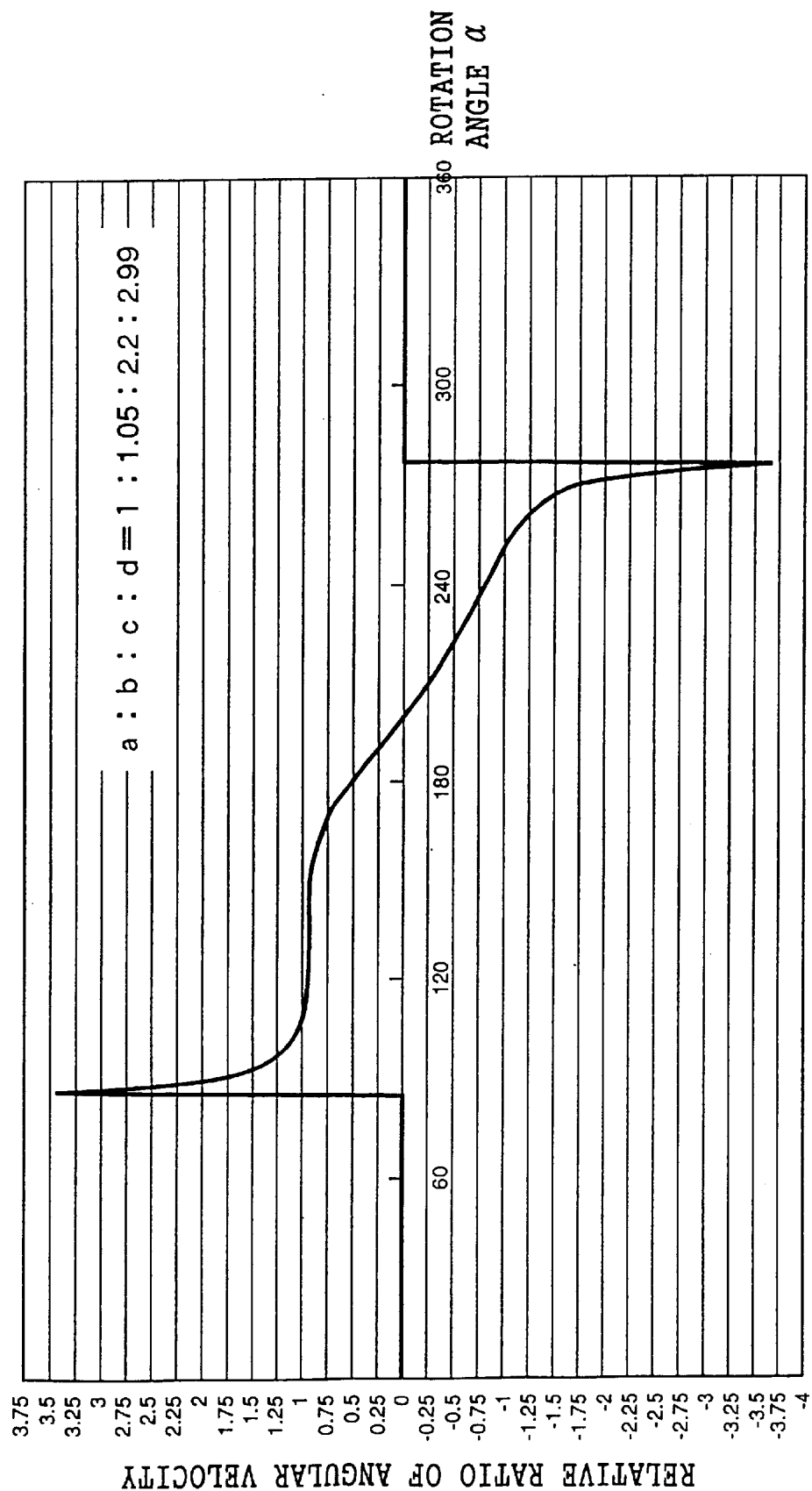
FIG. 5 is a characteristic view of angular velocities of rotation of a wiper arm when the relative ratios of pitches of levers and shafts are set at one of the upper limits in a wiper device according to an embodiment of the present invention.

The relative ratio that can make the angular velocity of rotation of the wiper arm 12 substantially equal to and as close as possible to the angular velocity of rotation of the main lever 14 (this ratio is called the upper limit) can set the angular velocity of rotation of the wiper arm 12 at an angular velocity of rotation which is substantially equal to that of the main lever 14 in a region where the rotation angle α is approximately from 100° to 160° as shown in FIG. 5 if, for example, the respective ratios of said pitch a to said pitch d are set as 1:1.05:2.2:2.99.

Thus, combinations of relative ratios that can make the angular velocity of rotation of the wiper arm 12 substantially equal to and as close as possible to the angular velocity of rotation of the main lever 14 are shown as data in FIG. 6. Further, FIG. 7 represents these data shown in FIG. 6 as a three-dimensional graph.

Figure 8:
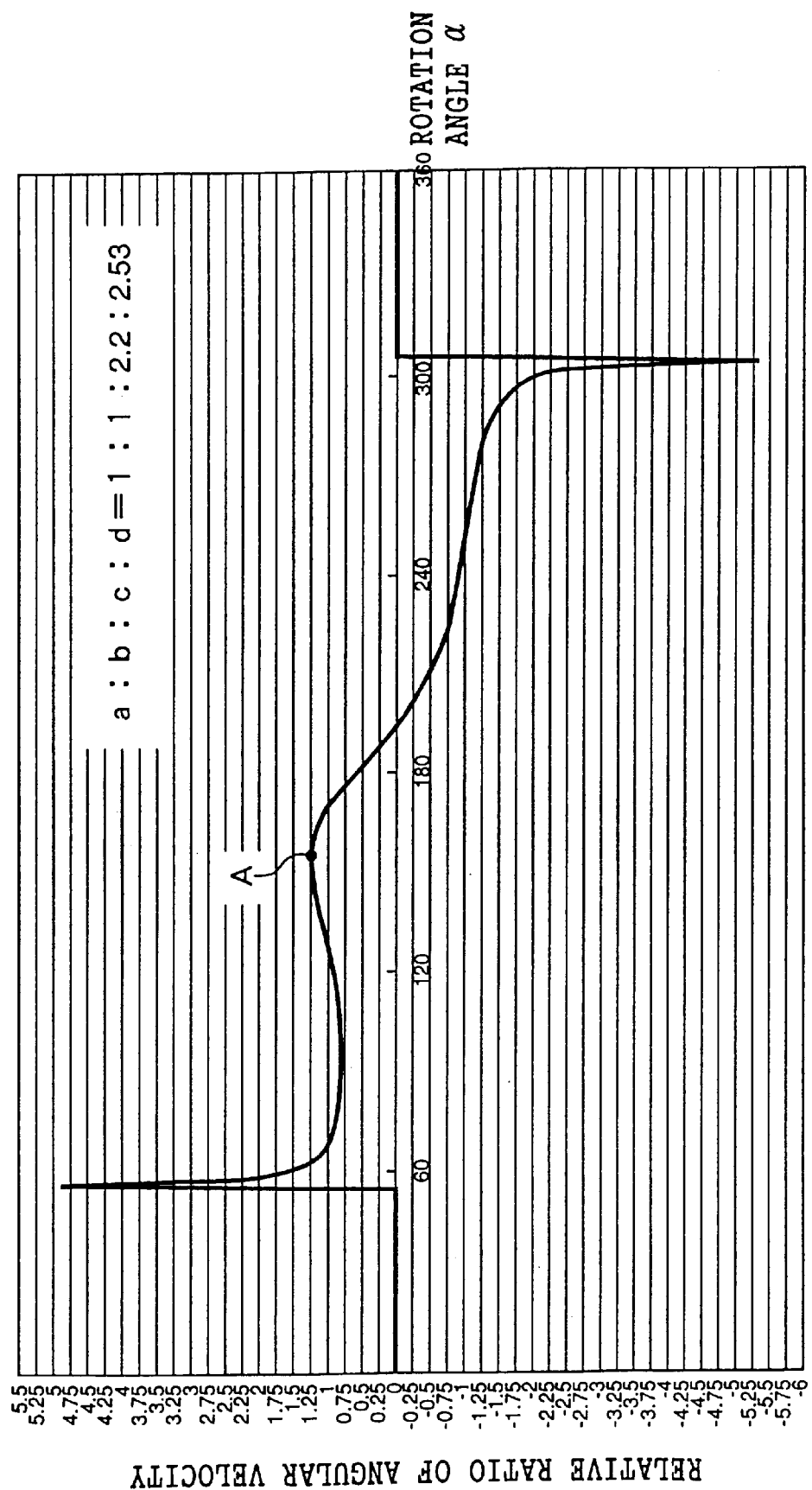
FIG. 8 is a characteristic view of angular velocities of rotation of a wiper arm when the relative ratios of pitches of levers and shafts are set at one of the lower limits in a wiper device according to an embodiment of the present invention.
Figure 9:
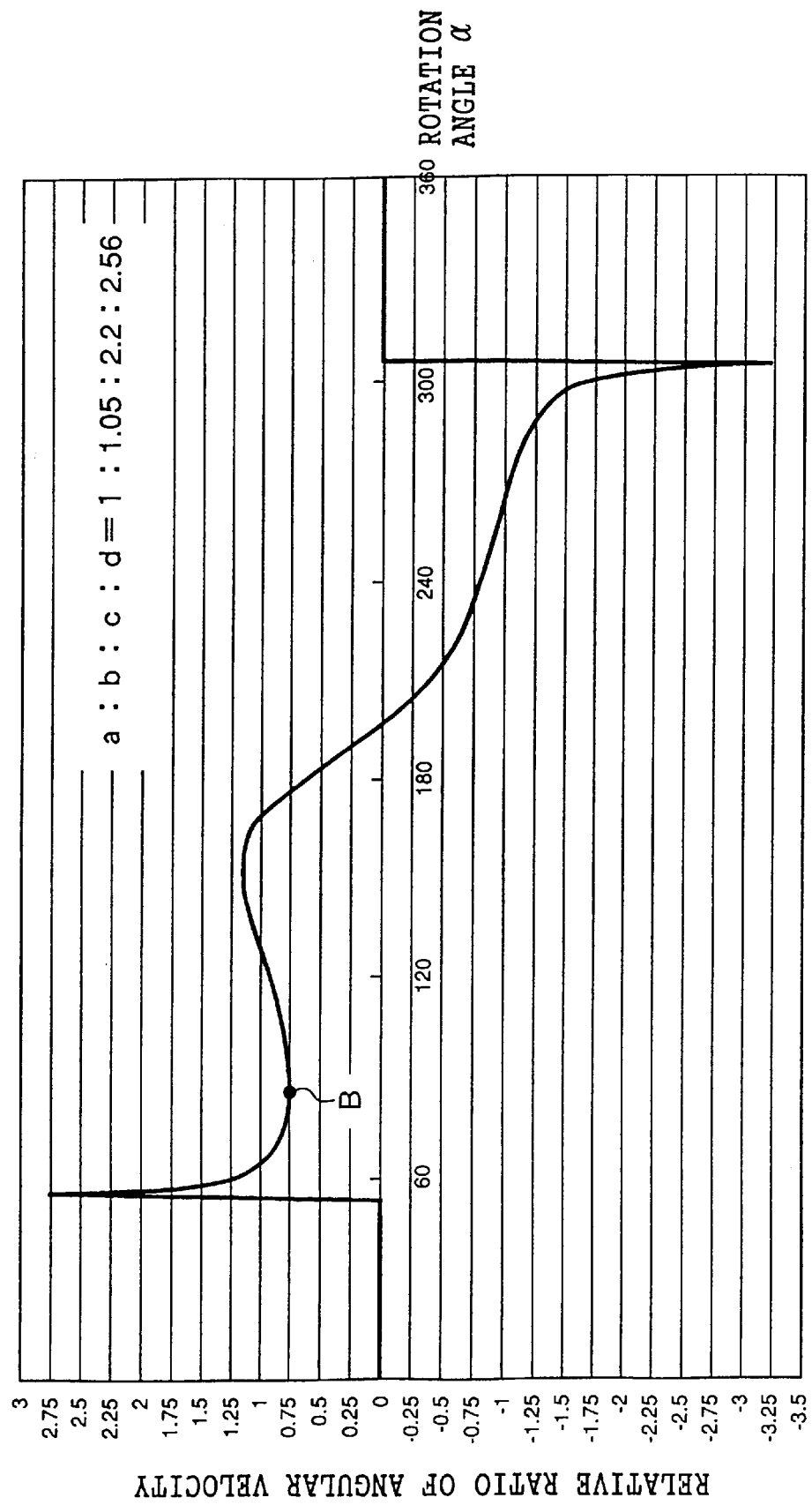
FIG. 9 is a characteristic view of angular velocities of rotation of a wiper arm when the relative ratios of pitches of levers and shafts are set at one of the lower limits in a wiper device according to an embodiment of the present invention.

On the other hand, if the relative ratios of pitches a through d are set to, for example, 1:1:2.2:2.53, when the fluctuation range of the angular velocity of rotation of the wiper arm 12 in relation to the angular velocity of rotation of the main lever 14 reaches the limit (this ratio is called the lower limit), the fluctuation range of the angular velocity of rotation of the wiper arm 12 reaches +25%, the maximum (point A), at the point where the rotation angle α is approximately 150°, as shown in FIG. 8. This indicates that it is the above-described lower limit (the threshold value of the+ side). Further, for example, if the respective ratio from pitch a to pitch d is set as 1:1.05:2.2:2.56, the fluctuation range of the angular velocity of rotation of the wiper arm 12 reaches −25%, the maximum (point B), at the point where the rotation angle α is approximately 80°, as shown in FIG. 9. This indicates that it is the above-mentioned lower limit (the threshold value of the−side).

Thus, combinations of the relative ratios when the fluctuation range of the angular velocity of rotation of the wiper arm 12 in relation to the angular velocity of rotation of the main lever 14 reaches the limit are shown as data in FIG. 10. Further, FIG. 11 represents these data shown in FIG. 10 as a three-dimensional graph.

Figure 7:
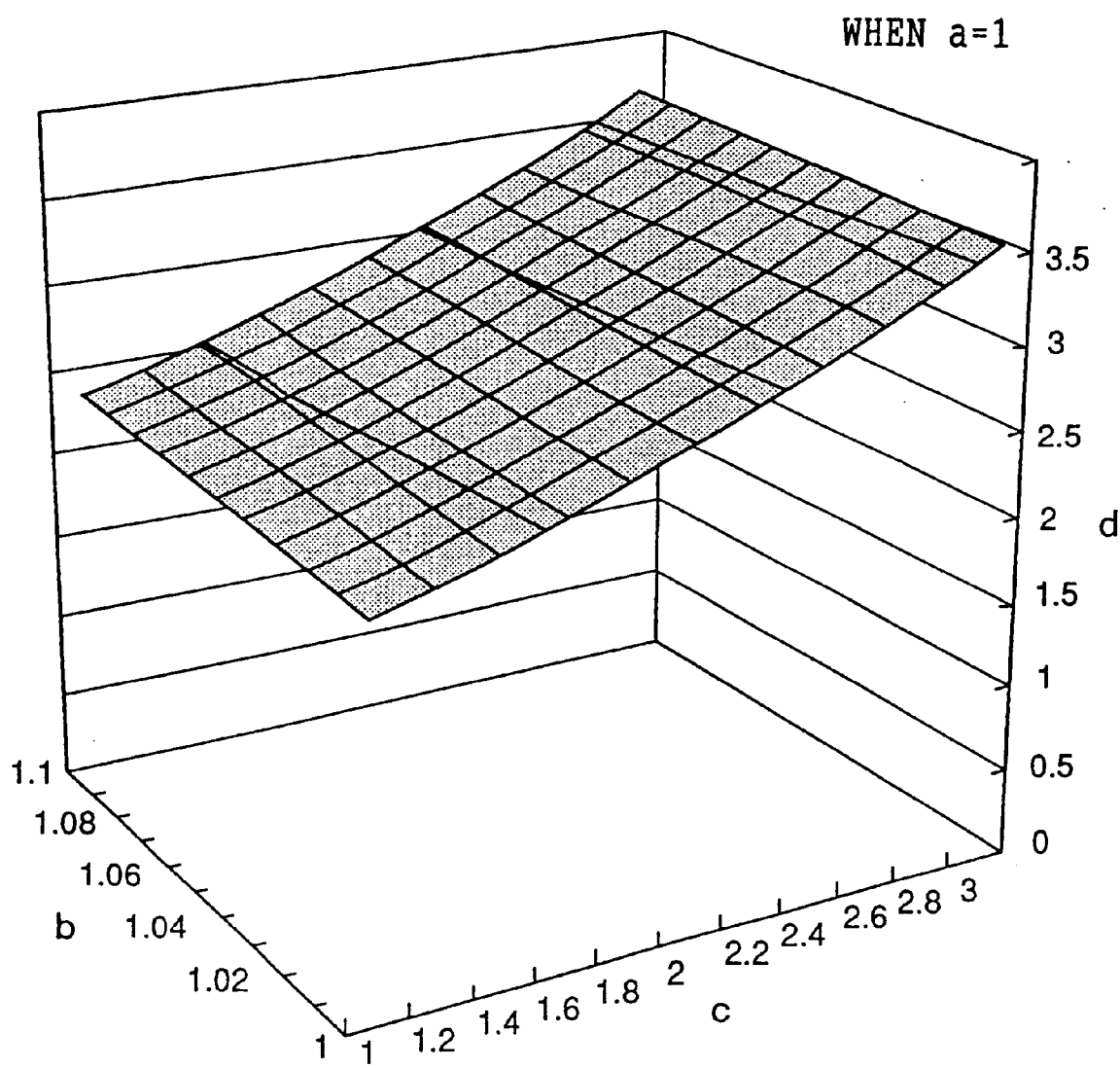
FIG. 7 is a corresponding view of the relative ratios of the upper limits representing the data shown in FIG. 6 as a three-dimensional graph.

Therefore, any combination of relative ratios existing between the upper limits shown in FIGS. 6 and 7 and the lower limits shown in FIGS. 10 and 11 can make the angular velocity of rotation of the wiper arm 12 fall within a range of from 0.75 to 1.25 times (fluctuating within a range of ±25%) the angular velocity of rotation of the main lever 14. Namely, FIG. 12 illustrates a graph synthesizing the upper limits shown in FIG. 7 and the lower limits shown in FIG. 11. By selecting a combination of relative ratios existing between the upper limits and the lower limits, the angular velocity of rotation of the wiper arm 12 can be within a range of from 0.75 to 1.25 times (fluctuating within a range of ±25%) the angular velocity of rotation of the main lever 14.

This prevents the fluctuation range of the angular velocity of rotation of the wiper arm 12 (the wiper blade 36) using the quadric linking mechanism in between the upper reversed position and the lower reversed position from becoming too large, thereby not giving the driver any uncomfortable sensation in the same way as a wiper device equipped with a conventional wiper arm.

Thus, in the wiper device for a vehicle 10 according to the present embodiment, not only the wiping range is enlarged by the compound movement wherein the quadric linking mechanism, that is, the wiper arm 12 is seemingly expanded and contracted while pivoted by the main lever 14, the sub-lever 16, and the arm head 24 to which the main lever 14 and the sub-lever 16 are connected, but a driver feels hardly any discomfort because the movement of the wiper arm 12 is smooth, the fluctuation range of the angular velocity of rotation is small as is the case with a conventional wiper arm, and the fluctuation in the wiping speed of the wiper 10 in relation to the second wiper device 50 is small. Furthermore, as the fluctuation range of the angular velocity of rotation of the wiper arm 12 is small as is the case with a conventional wiper arm, the input load to the wiper device 10 does not increase momentarily, thereby obviating the need for other new measures to ensure the strength of each component. Moreover, as the angular velocity of rotation does not increase near the reversed positions, there is no possibility of large-scale overrun of the wiper arm 12 (the wiper blade 36) occuring.

What is claimed is:

1. A wiper system for a vehicle, comprising:
   first and second wiper devices;
   said first wiper device comprising:
   a quadric linking mechanism which includes;
   a main lever connected to a pivoting shaft provided in a vehicle body and pivotable with said pivoting shaft;
   said main lever being rotatable through a rotation angle;
   a sub-lever pivotally supported by a spindle provided in said vehicle body at a predetermined distance from said pivoting shaft;

an arm head having an end portion of said main lever pivotally connected thereto via a first connecting shaft and having an end portion of said sub-lever pivotally connected thereto via a second connecting shaft;

a wiper arm connected to said arm head and having an end portion of a wiper blade connected thereto, said wiper arm being pivotable through a predetermined angle in accordance with the pivotal movement of said main lever, a range of the rotation angle of said main lever being from 75° to 178°, the rotation angle of said wiper arm being at least 94.8°, and the ratio among a distance "a" between said pivoting shaft and said first connecting shaft, a distance "b" between said first connecting shaft and said second connecting shaft, a distance "c" between said spindle and said second connecting shaft, and a distance "d" between said pivoting shaft and said spindle for a:b:c:d is 1:1.06:2.12:2.56, for minimizing fluctuations in wiper speed of the first wiper device.

2. A wiper system as claimed in claim 1, wherein said wiper arm provides a wiping range for wiping a surface;

said wiping range is enlarged by an expansion length of said wiper arm by operation of said quadric linking mechanism; and the expansion length of said wiper arm equals the sum of the distance "a" from said pivoting shaft to said first connecting shaft, and the distance "b" from said first connecting shaft to said second connecting shaft, minus the distance "e" from said pivoting shaft to said second connecting shaft measured when device is in its at-rest position.

3. A wiper system for a vehicle, comprising:

a first wiper device comprising:
 a quadric linking mechanism which includes:
  a main lever connected to a pivoting shaft located in a vehicle body and pivotable with said pivoting shaft, said main lever being rotatable through a rotation angle;
  a sub-lever pivotally supported by a spindle located in said vehicle body at a predetermined distance from said pivoting shaft;
  an arm head having an end portion of said main lever pivotally connected thereto via a first connecting shaft and having an end portion of said sub-lever pivotally connected thereto via a second connecting shaft; and
 a wiper arm connected to said arm head and having an end portion of a wiper blade connected thereto, said wiper arm being pivotable through a predetermined angle in accordance with the pivotal movement of said main lever thereby providing a wiping range for wiping a surface;

said wiping range being enlargeable by an expansion length of said wiper arm by operation of said quadric linking mechanism; and the expansion length of said wiper arm being the sum of distance "a" between said pivoting shaft and said first connecting shaft and distance "b" between said first connecting shaft and said second connecting shaft, minus the distance "e" between said pivoting shaft and said second connecting shaft when the device is in its at-rest position;

wherein said distance "a", said distance "b", distance "c" between the spindle and said second connecting shaft, and distance "d" between said pivoting shaft and the spindle are such that a range of angular velocity of rotation of said wiper arm is from 0.75 to 1.25 times the angular velocity of rotation of said main lever at any point in the wiping range of said wiper arm.

4. The wiper system of claim 3, further comprising:

a second wiper device provided in said vehicle body independently of said first wiper device;

said second wiper device including a second pivoting shaft provided in said vehicle body independently of said pivoting shaft and pivotable synchronously with said pivoting shaft, and a second wiper arm connected to said second pivoting shaft and a wiper blade connected to an end portion thereof.

\* \* \* \* \*